United States Patent

[11] 3,610,807

| [72] | Inventor | Daniel L. Whitehead<br>Export, Pa. |
|---|---|---|
| [21] | Appl. No. | 807,653 |
| [22] | Filed | Mar. 17, 1969 |
| [45] | Patented | Oct. 5, 1971 |
| [73] | Assignee | Westinghouse Electric Corporation<br>Pittsburgh, Pa. |

[54] ELECTRIC POWER TRANSMISSION SYSTEM INCLUDING PRESSURIZED PIPE HAVING CENTRAL CONDUCTOR AND PROVIDING AN EXPANSION JOINT AND GAS-BARRIER CONSTRUCTION
10 Claims, 6 Drawing Figs.

[52] U.S. Cl. ................................................ 174/13,
   174/21 C, 174/28, 174/99 E, 285/224
[51] Int. Cl. ................................................ H01b 9/06,
   H02g 15/24
[50] Field of Search ................................................ 174/12, 13,
   16, 16 B, 21, 21.3, 21.4, 22, 22.2, 27, 28, 29, 88 B,
   88.2, 99, 99 B, 99 E; 285/224, 225; 165/81, 82, 83

[56] References Cited
UNITED STATES PATENTS

| 1,900,561 | 3/1933 | Junggren | 285/224 |
| 2,024,957 | 12/1935 | Van de Graaff | 174/28 UX |
| 2,165,961 | 7/1939 | Cork et al. | 174/12 UX |
| 2,874,207 | 2/1959 | Schymik | 174/12 X |
| 2,977,404 | 3/1961 | Swendlow | 174/99 B |
| 3,361,870 | 1/1968 | Whitehead | 174/99 B |

FOREIGN PATENTS

| 1,253,315 | 1/1961 | France | 165/81 |
| 1,029,841 | 5/1958 | Germany | 165/83 |
| 647,782 | 7/1937 | Germany | 174/28 |
| 482,061 | 3/1938 | Great Britain | 174/12 |

*Primary Examiner*—Laramie E. Askin
*Attorneys*—A. T. Stratton, Clement L. McHale and Willard R. Crout ABSTRACT: A pressurized gas-insulated enclosed high-voltage conductor or conductors are located axially within a surrounding grounded pipe, and enlarged expansion joints for accommodating a wide range of temperatures are provided. Additionally, to prevent a sudden surge of transient pressure being developed along the pressurized transmission line, space gas barrier constructions having orifices are provided.

INVENTOR
Daniel L. Whitehead
BY
Willard R. Crout
ATTORNEY 3,610,807

ELECTRIC POWER TRANSMISSION SYSTEM INCLUDING PRESSURIZED PIPE HAVING CENTRAL CONDUCTOR AND PROVIDING AN EXPANSION JOINT AND GAS-BARRIER CONSTRUCTION

BACKGROUND OF THE INVENTION

In U.S. Pat. No. 3,378,731, issued Apr. 16, 1968 to Daniel L. Whitehead, and assigned to the assignee of the instant application, there is disclosed structures relating to an electric power distribution system, and more particularly to a high-voltage substation. The components of the substation are enclosed in a grounded conducting pipe containing a pressurized high-dielectric insulating medium, such as sulfur-hexafluoride ($SF_6$) gas. The power demands of some of our large metropolitan cities have reached such proportions that it is now necessary to transmit power into such cities at 345,000 volts, with the possibility of eventually going to much higher voltages. Present practice is to use a cable system under the city streets with risers to outdoor substations and switch yards. The switch yards comprise disconnecting switches, circuit breakers, lightning arresters, transformers and auxiliary apparatus so connected as to provide electrical service to local areas. With the construction, as set forth in the aforesaid U.S. Pat. No. 3,378,731, it is necessary to utilize a pressurized-pipe construction for transmitting large blocks of power.

U.S. Pat. No. 3,356,798, issued Dec. 5, 1967 to John P. McKinnon illustrates a disconnecting switch for such a pressurized-gas distribution system. Additional reference may be made to U.S. Pat. No. 3,361,870, issued Jan. 2, 1968 to Daniel L. Whitehead, which shows an electric power transmission system including three-phase conductors, each disposed in a separate return conductor.

Also attention may be directed to U.S. Pat. No. 3,345,450, issued Oct. 3, 1967 to Harvey E. Spindle, which illustrates a pressurized gas-insulated enclosed high-voltage conductor having insulators surrounding the conductor at spaced intervals, and using a high-dielectric gas, such as sulfur-hexafluoride ($SF_6$) gas, at a suitable pressure for providing the main insulation.

Accordingly, it is a general object of the present invention to provide an improved pressurized-pipe system utilizing expansion joints to accommodate axial thermal expansion over a wide range of temperatures.

Additionally, it is an object of the present invention to provide a means for preventing the possibility of transient pressure surges being developed along the pressurized-pipe system due to a fault condition existing, or any other sudden change in gas pressure such as may be caused by ruptured pipe, etc., which would tend to force the disk insulators, supporting the central high-voltage conductor, out of their proper position.

Another object of the present invention is to provide an improved pressurized-pipe system, involving a baffle construction to localize the damage occurring by a fault condition generating a pressure surge along the gas-pressure transmission system.

Another object of the present invention is to provide an improved thermal expansion joint for a pressurized-type conduit system.

Still a further object of the present invention is to provide a means for preventing pressure surges being transmitted along a pressurized-pipe transmission system.

Further objects and advantages will readily become apparent upon reading the following specification taken in conjunction with the drawings.

DESCRIPTION OF THE PREFERRED EMBODIMENTS

The present invention relates generally to electric power distribution systems, and more particularly to pressure-insulated pipe electrical systems of the type described in U.S. Pat. No. 3,378,731, issued Apr. 16, 1968 to Daniel L. Whitehead. The aforesaid patent relates to high-voltage substations for metropolitan areas, in which pressurized-pipe components are utilized together with conventional components, such as disconnecting switches, circuit breakers, lightning arresters, transformers and auxiliary apparatus. To carry the electric power along the system and between the several components, it is desirable to utilize a pressurized-pipe system, wherein a centrally located high-voltage conductor or conductors are disposed within a pressurized grounded pipe, and is spaced from the inner walls of the grounded pipe by spaced insulating disks.

The electric transmission system, described in the aforesaid patent, requires an expansion joint to permit satisfactory operation over a wide range of temperatures. The construction illustrated in FIGS. 1–3 illustrates a means for providing such expansion.

Figure 1:
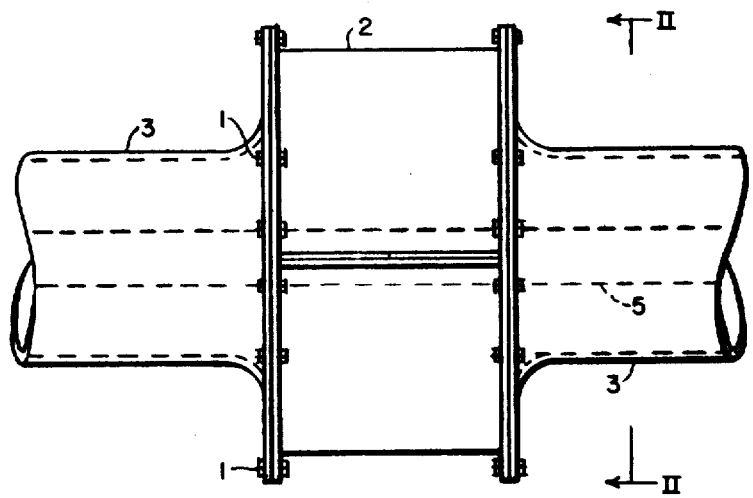
FIG. 1 fragmentarily illustrates a portion of a pressurized-pipe transmission system shown in side elevation for isolated single-phase configuration.
Figure 2:
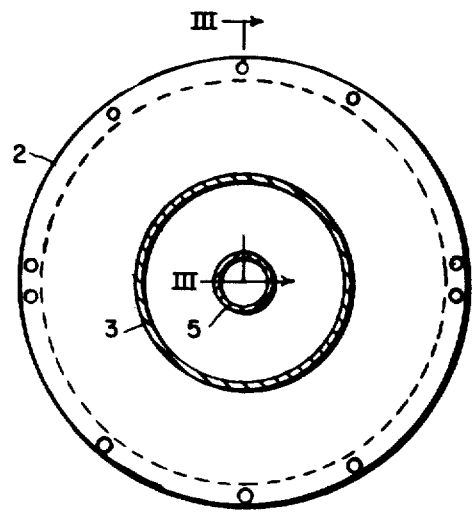
FIG. 2 is an end elevational view of the pressurized-pipe conduit system of FIG. 1, looking in the direction of the arrows II—II of FIG. 1.
Figure 3:
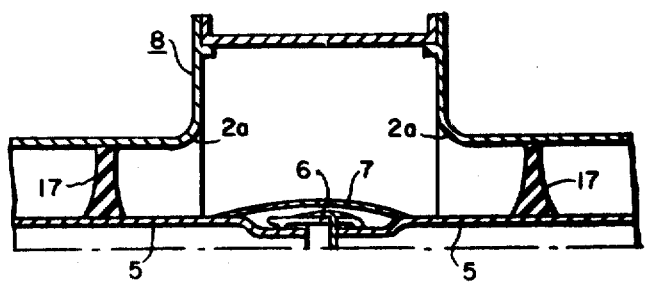
FIG. 3 is a vertical sectional view taken through the pressurized-pipe conduit system of FIGS. 1 and 2, taken generally along the line III—III of FIG. 2.

In addition to being an expansion joint, the construction set forth in FIGS. 1–3 also provides a practical method for field assembly and for inspection of the system. FIGS. 1-a bolted connection 1 involving an enlarged wall section 1, that can absorb longitudinal movement of the pressurized pipe 3. A main conductor 5 can expand and contract freely through the cluster of pressure contact fingers 6, which may be similar to those used in drawout-type circuit breakers utilized in metal-clad switchgear, as well understood by those skilled in art.

The enlarged pipe section 2 with the internal corners 2a well rounded has higher electric strength at the expansion joint than at the original pipe section. This makes shielding 7 of the contact fingers 6 quite simple. The same arrangement can be used for both underground transmission, as well as for pressurized substation arrangements, as set forth in the aforesaid U.S. Pat. No. 3,378,731.

Figure 4:
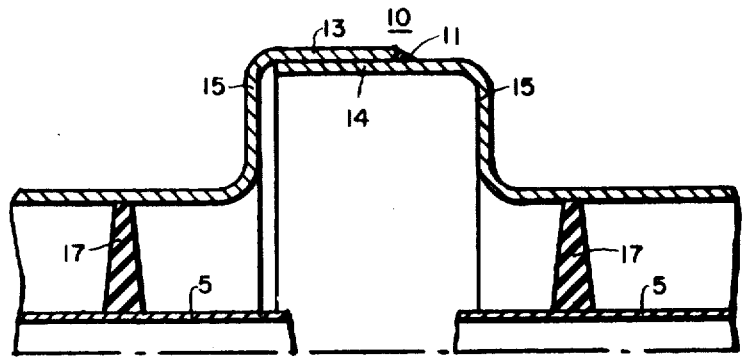
FIG. 4 is a vertical sectional view taken through a modified type of pressurized-pipe system illustrating a welded construction, where maintenance would probably not be required.

When an expansion joint 8 is required, without the necessity for an easy inspection of the conductor 5 and the finger-cluster assembly 6, a solidly welded joint 10 can be used, such as illustrated in FIG. 4 of the drawings. Here it will be noted that there is provided a weld 11 fixedly connecting the two sections 13, 14 at the expanded wall portion 15. The finger arrangement 6 may be identical to that set forth in FIG. 3 of the drawings to accommodate axial movement of the central high-voltage conductors 5.

In the event of a short circuit occurring on the pressurized-pipe transmission system, or in the substation connected therewith, there is some possibility of transient pressure being developed, that would tend to force the disk insulators 17 along the pressurized pipe 3, thus causing considerable damage at some distance from the fault location. To localize the damage from such a fault condition, or failure, a combined expansion joint and gas barrier 19 could be utilized, as is illustrated in FIG. 5 of the drawings.

Figure 5:
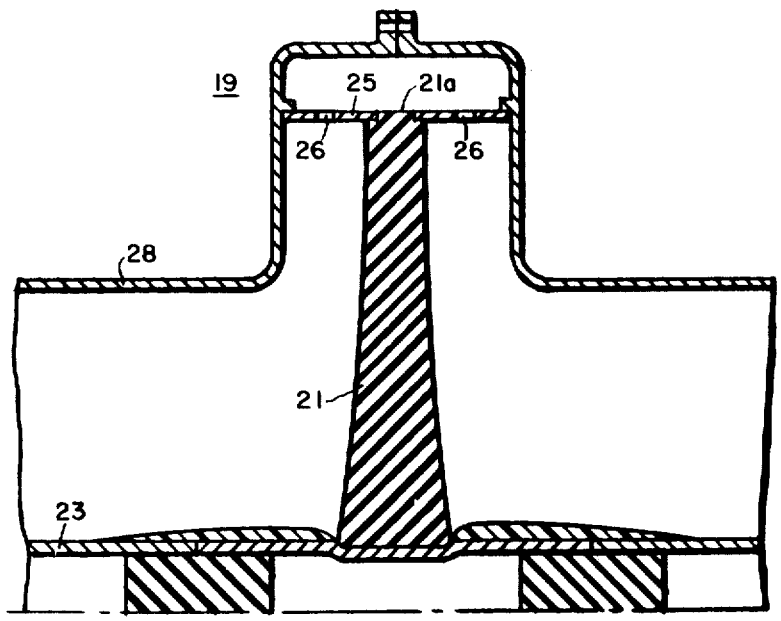
FIG. 5 is a vertical sectional view taken through another embodiment of the invention showing a gas-barrier construction for preventing pressure surges being transmitted axially along the pressurized-pipe system; and, FIG. 6 illustrates a modification of FIG. 5 wherein the central high-voltage conductor is vented on opposite sides of the supporting insulating disk.

It will be noted that a heavy disk insulator 21 is connected rigidly to the inner high-voltage conductor 23, with its outside perimeter 21a, or periphery extending into an expansion joint, as shown in FIG. 5. The perimeter 21a of the insulator 21 is further surrounded by circular barriers 25, that have holes 26 of proper size to act as orifices to conduct the flow of gas during normal operating conditions, and yet be sufficiently small to prevent large quantities of high-pressure gas, caused by a short circuit, to flow along the pipe 28.

Figure 6:
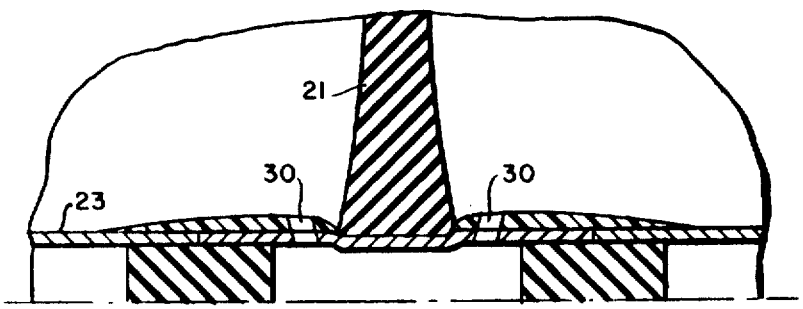

The baffle and orifice arrangement forces the gas to make a 90° turn, and then a 180° turn, and then another 90° turn, thus effectively slowing down the gas in somewhat the same manner as an automobile muffler controls the exhaust gas from an automobile engine. The size and number of orifices, or holes 26 lend themselves to calculation, since the total energy content of the short circuit will be known. This permits the rate of rise and total expansion of the gas to be calculated. The baffle 25 could be made quite simply and inexpensively by cutting short sections from a pipe of the proper diameter and wall thickness. Holes 26 of the proper size to act as calibrated orifices could be made by drilling at points around the perimeter of the baffle section 25. Also, additional venting could be had by drilling properly spaced holes 30 in the central conductor 23 on each side of the disk insulator 21, as shown in FIG. 6.

From the foregoing description, it will be apparent that there has been provided an improved thermal expansion joint in a pressurized-pipe transmission system to accommodate axial expansions over a wide range of temperature. Additionally, a means has been shown for accommodating the current flow along the centrally provided high-voltage conductor 5, 23 by a contact-finger construction 6. Finally, because of the disclosed baffle construction 25 utilizing orifices 26 to cause the gas flow, caused by pressure surges from a fault condition to take a devious path, the insulators 17, 21 will not be blown out of position, and the fault condition can be localized.

Although the foregoing constructions have been particularly concerned with single-phase transmission, it will be obvious to those skilled in the art that for a three-phase transmission system, such as set forth in Whitehead U.S. Pat. No. 3,361,870, a plurality of high-voltage conductors, such as the conductors 13 in the aforesaid U.S. Pat. No. 3,361,870, could be provided and collectively supported by a single insulating disk, in the manner as shown in the illustrated constructions in the drawings.

Although there has been illustrated and described specific structures, it is to be clearly understood that the same were merely for the purpose of illustration, and that changes and modifications may readily be made therein by those skilled in the art without departing from the spirit and scope of the invention.

I claim as my invention:

1. An electric power transmission system, comprising, in combination:
   a. a generally cylindrical outer metallic pipe;
   b. at least one high-voltage conductor disposed inside said metallic pipe;
   c. a plurality of disk-type insulators spaced axially along the high-voltage conductor to support it within the metallic pipe;
   d. said pipe containing a dielectric fluid under pressure; and,
   e. means defining an enlarged expansion joint having flexible wall portions;
   f. said expansion joint comprising a radially outwardly flared flexible integral end portion of said pipe and a relatively large diameter axially extending metallic cylindrical portion connected to said outwardly flared end portion.

2. The combination according to claim 1, wherein the high-voltage conductor is discontinuous at the enlarged expansion joint, and circumferentially disposed contact fingers carry the current about the discontinuous portion of the high-voltage conductor.

3. The combination of claim 2, wherein a cylindrical shield surrounds the circumferentially disposed contact fingers.

4. The combination according to claim 1, wherein the enlarged expansion joint includes a split longitudinally extending housing.

5. The combination according to claim 1, wherein the enlarged expansion joint includes two cylindrical housing portions welded together.

6. The combination of claim 1, wherein the enlarged expansion joint has its outer portion discontinuous and the discontinuous portions are secured together in a gastight manner.

7. The combination of claim 1, wherein the enlarged expansion joint has two radially outwardly extending flange portions and split semicircumferential housing portions all secured together in a gastight manner.

8. An electric power transmission system, comprising, in combination:
   a. a generally cylindrical outer metallic pipe;
   b. at least one high-voltage conductor disposed inside said metallic pipe generally along the central axis thereof;
   c. a plurality of disk-type insulators spaced axially along the high-voltage conductor to support it within the metallic pipe;
   d. said pipe containing a dielectric fluid underpressure;
   e. means defining an enlarged expansion joint having flexible wall portions;
   f. said expansion joint comprising an enlarged metallic pipe section and extending racially outwardly from the normal cylindrical wall of the metallic pipe; and,
   g. an enlarged insulating disk extending into the enlarged expansion joint and having a perforated metallic cylindrical barrier member located at its outer periphery.

9. The combination according to claim 8, wherein shoulder portions secured to the enlarged expansion joint bear against the perforated metallic cylindrical barrier member.

10. An electric power transmission system, comprising, in combination:
    a. a generally cylindrical outer metallic pipe;
    b. at least one high-voltage conductor disposed inside said metallic pipe generally along the central axis thereof;
    c. a plurality of disk-type insulators spaced axially along the high-voltage conductor to support it within the metallic pipe;
    d. said pipe containing a dielectric fluid under pressure;
    e. means defining an enlarged expansion joint having flexible wall portions;
    f. said expansion joint comprising an enlarged metallic pipe section and extending radially outwardly from the normal cylindrical wall of the metallic pipe;
    g. an enlarged insulating disk extending into the enlarged expansion joint; and,
    h. said high-voltage conductor having venting holes on opposite sides of the enlarged insulating disk.